United States Patent
Matsuda et al.

(10) Patent No.: US 9,085,226 B2
(45) Date of Patent: Jul. 21, 2015

(54) VEHICLE

(71) Applicant: Fuji Jukogyo Kabushiki Kaisha, Tokyo (JP)

(72) Inventors: Hiroshi Matsuda, Tokyo (JP); Toshiaki Naruke, Tokyo (JP); Minoru Iida, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 120 days.

(21) Appl. No.: 13/788,353

(22) Filed: Mar. 7, 2013

(65) Prior Publication Data

US 2013/0248264 A1 Sep. 26, 2013

(30) Foreign Application Priority Data

Mar. 22, 2012 (JP) .................................. 2012-066143

(51) Int. Cl.
*B60K 6/40* (2007.10)
*B60K 1/04* (2006.01)
*B60K 11/06* (2006.01)
*B60K 17/22* (2006.01)
*B60K 1/00* (2006.01)

(52) U.S. Cl.
CPC ... *B60K 6/40* (2013.01); *B60K 1/04* (2013.01); *B60K 11/06* (2013.01); *B60K 17/22* (2013.01); *B60K 2001/005* (2013.01); *B60K 2001/0422* (2013.01); *B60K 2001/0438* (2013.01); *Y10S 903/951* (2013.01)

(58) Field of Classification Search
USPC ............ 180/65.1, 65.31, 68.5, 291, 292, 309, 180/69.1; 903/907, 951
See application file for complete search history.

(56) References Cited

U.S. PATENT DOCUMENTS

| 1,138,122 | A | | 5/1915 | Lambert et al. |
| 4,445,584 | A | * | 5/1984 | Kimura et al. ............. 180/69.22 |
| 4,738,459 | A | * | 4/1988 | Nakamura et al. ............ 180/409 |
| 5,501,289 | A | * | 3/1996 | Nishikawa et al. .......... 180/68.5 |
| 5,562,178 | A | * | 10/1996 | Worden et al. ................ 180/291 |
| 5,833,023 | A | | 11/1998 | Shimizu |
| 6,041,877 | A | * | 3/2000 | Yamada et al. ............ 180/65.25 |
| 6,547,020 | B2 | * | 4/2003 | Maus et al. .................. 180/68.5 |
| 8,182,393 | B2 | * | 5/2012 | Gillingham et al. .............. 477/8 |
| 8,480,538 | B2 | * | 7/2013 | Gillingham et al. .............. 477/8 |

(Continued)

FOREIGN PATENT DOCUMENTS

| JP | 4-312304 | 11/1992 |
| JP | H05-208617 | 8/1993 |

(Continued)

*Primary Examiner* — J. Allen Shriver, II
*Assistant Examiner* — Bridget Avery
(74) *Attorney, Agent, or Firm* — Smith, Gambrell & Russell, LLP

(57) ABSTRACT

A hybrid vehicle which is driven using the power of an engine and the power of a drive motor which is driven by an electric power supplied from a battery module, the vehicle including: a propeller shaft which is disposed below a floor panel in a vertical direction of the vehicle extending in a fore-and-aft direction of the vehicle, and is configured to transmit the power of the engine and the power of the drive motor to a rear wheel; and a battery pack having the battery module, the battery pack being disposed below the floor panel so as to cover the propeller shaft. The battery pack has a recess formed in a fore-and-aft direction of the vehicle, and the propeller shaft is housed in an air guide duct defined by the floor panel and the recess of the battery pack.

6 Claims, 4 Drawing Sheets

(56) References Cited

U.S. PATENT DOCUMENTS

| | | | |
|---|---|---|---|
| 8,714,289 B2 * | 5/2014 | Olsen et al. | 180/65.29 |
| 2010/0163322 A1 * | 7/2010 | Stefani et al. | 180/65.21 |
| 2010/0307848 A1 * | 12/2010 | Hashimoto et al. | 180/68.5 |
| 2012/0312612 A1 * | 12/2012 | Harrison et al. | 180/68.5 |
| 2013/0133961 A1 | 5/2013 | Matsuda et al. | |

FOREIGN PATENT DOCUMENTS

| | | |
|---|---|---|
| JP | 07-047842 | 2/1995 |
| JP | 2000-247261 | 9/2000 |
| JP | 2010-155570 | 7/2010 |

\* cited by examiner

VEHICLE

CROSS-REFERENCE TO RELATED APPLICATIONS

The present application claims priority from Japanese Patent Application No. 2012-066143 filed on Mar. 22, 2012, the entire contents of which are hereby incorporated by reference.

BACKGROUND OF THE INVENTION

1. Field of the Invention

The present invention relates to a vehicle, particularly to a vehicle in which a battery pack is disposed outside the vehicle cabin.

2. Description of the Related Art

There has been known a vehicle (so-called electric vehicle or hybrid vehicle) provided with a battery pack including a plurality of battery modules. If a hybrid vehicle is taken as an example, a typical hybrid vehicle is known to have a structure in which a battery pack is disposed on the back of the rear seat or below the luggage space.

Such a structure of a hybrid vehicle has a problem in that the presence of the battery pack reduces the trunk space behind the rear seat. In addition, the typical hybrid vehicle has a problem in that weight distribution of the vehicle in the fore-and-aft direction thereof is difficult to be adjusted due to the weight of the battery pack.

Thus, in recent years, there has been proposed a hybrid vehicle in which the battery pack is disposed below the center in the fore-and-aft direction of the vehicle, i.e., below the floor panel of the vehicle. For example, Japanese Unexamined Patent Application Publication (JP-A) No. 2000-247261 discloses a structure of the vehicle floor, in which the battery is disposed below the floor panel of the vehicle.

In addition, there has been proposed a technology for cooling a battery by supplying power from a power source for driving a vehicle or a power source for auxiliary machinery and rotating a fan for cooling the battery (JP-A No. 4-312304).

In the case of a FWD or 4WD vehicle which needs a propeller shaft, and in which a battery is installed below the floor panel of the vehicle, a plurality of batteries need to be disposed on both sides of the propeller shaft in the vehicle width direction.

In the above configuration, the battery may directly receive heat from an engine or a radiator at the front of the vehicle while the vehicle is being driven. Application of a heat insulating structure for heat damage prevention to each of a plurality of batteries disposed on both sides of the propeller shaft causes a significant increase in weight and cost.

SUMMARY OF THE INVENTION

The present invention has been made in view of the above-mentioned problem, and it is an object of the invention to provide a vehicle capable of preventing heat damage to the battery.

An aspect of the present invention provides a vehicle which is driven using power of a drive motor which is driven by electric power supplied from a secondary battery, the vehicle including: a propeller shaft which is disposed below a floor panel in a vertical direction of the vehicle extending in a fore-and-aft direction of the vehicle, and is configured to transmit the power of the drive motor to a rear wheel; and a battery unit having the secondary battery, the battery unit being disposed below the floor panel so as to cover the propeller shaft. The battery unit has a recess formed in a fore-and-aft direction of the vehicle, and the propeller shaft is housed in an air guide duct defined by the floor panel and the recess of the battery unit. Thus, heat damage to the battery unit can be prevented.

Preferably, the vehicle further includes an air guide plate which is disposed extending from an internal combustion engine provided at the front of the vehicle to the above-mentioned air guide duct.

Preferably, the propeller shaft of the vehicle is provided with a first fan.

Preferably, the inlet or outlet of the air guide duct of the vehicle is provided with a second fan.

Preferably, the air guide duct of the vehicle is composed of a heat insulating material.

DESCRIPTION OF THE PREFERRED EMBODIMENTS

Figure 1:
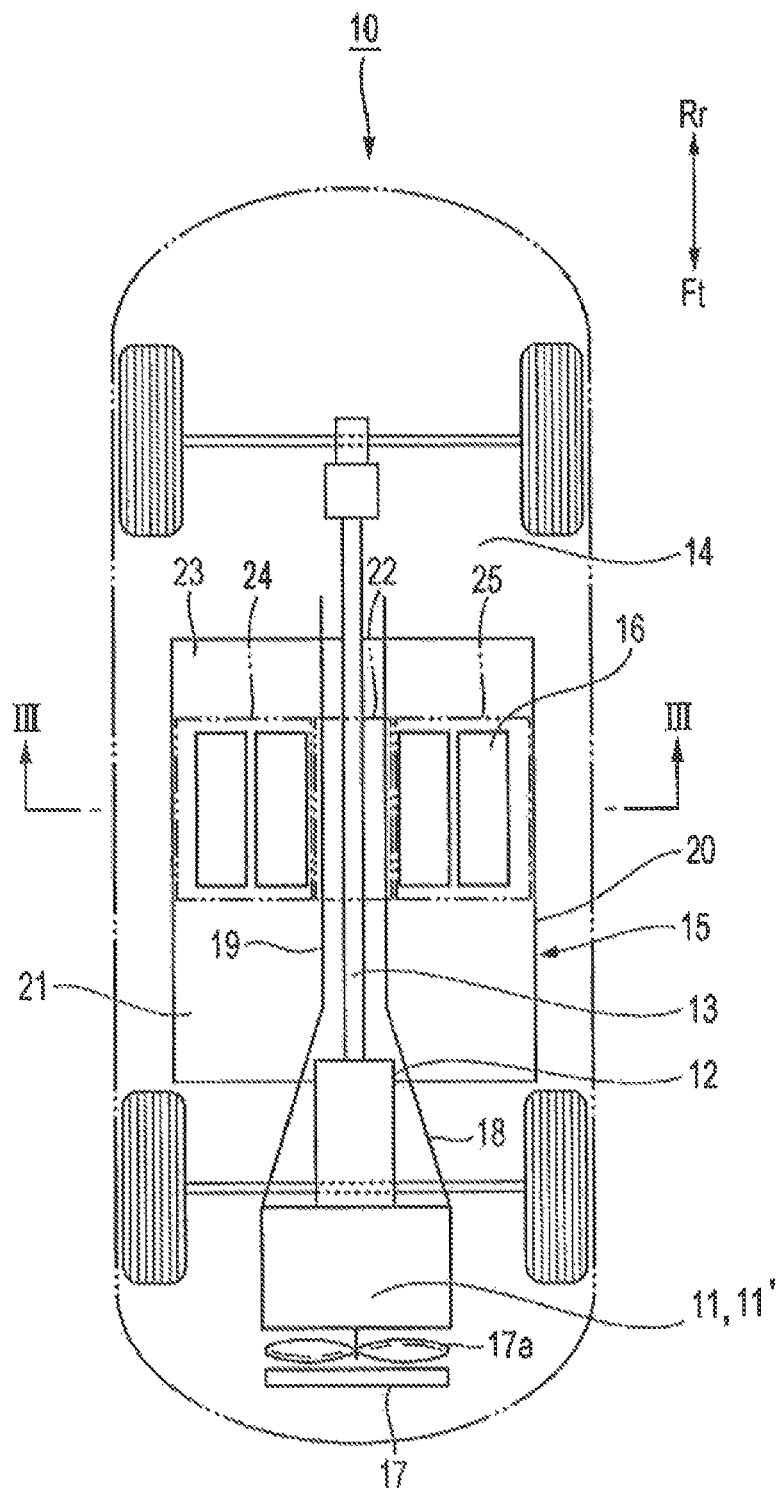
FIG. 1 is a schematic plan view of the structure of a hybrid vehicle according to an embodiment of the present invention.

Hereinafter, a hybrid vehicle according to an embodiment of the present invention will be described with reference to FIGS. 1 to 5. FIG. 1 is a schematic plan view of the structure of a hybrid vehicle 10 according to an embodiment of the present invention.

Figure 2:
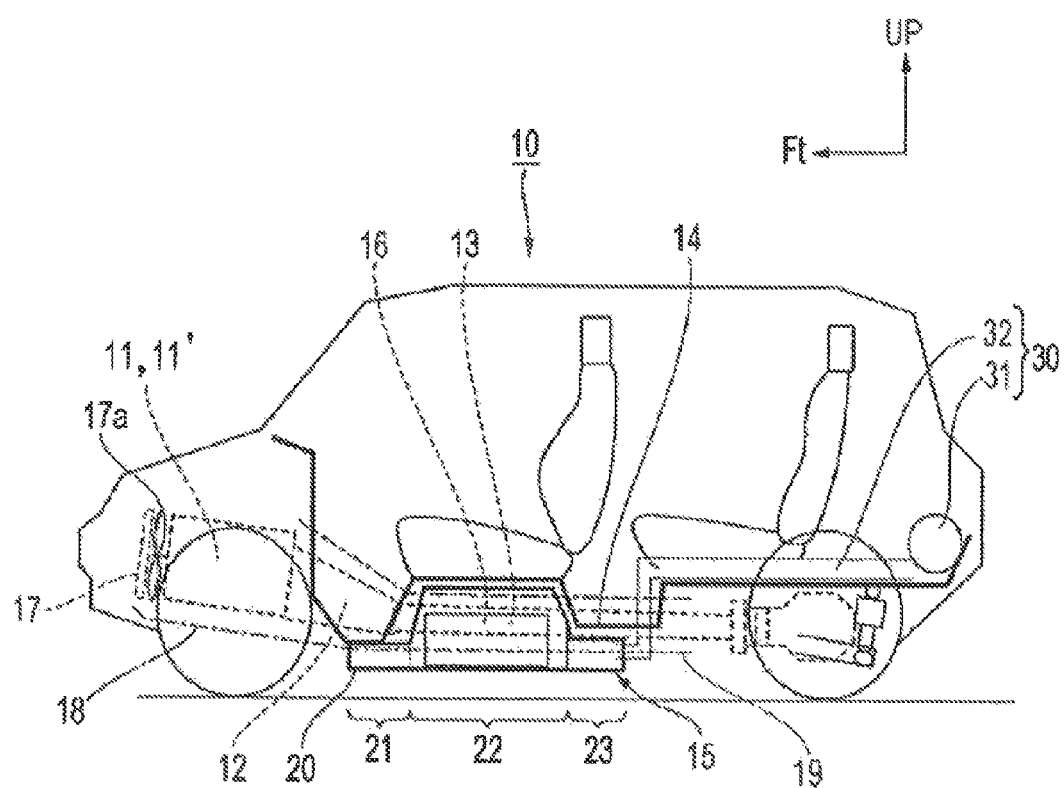
FIG. 2 is a schematic side view of the structure of a hybrid vehicle according to the embodiment of the present invention.
Figure 3:
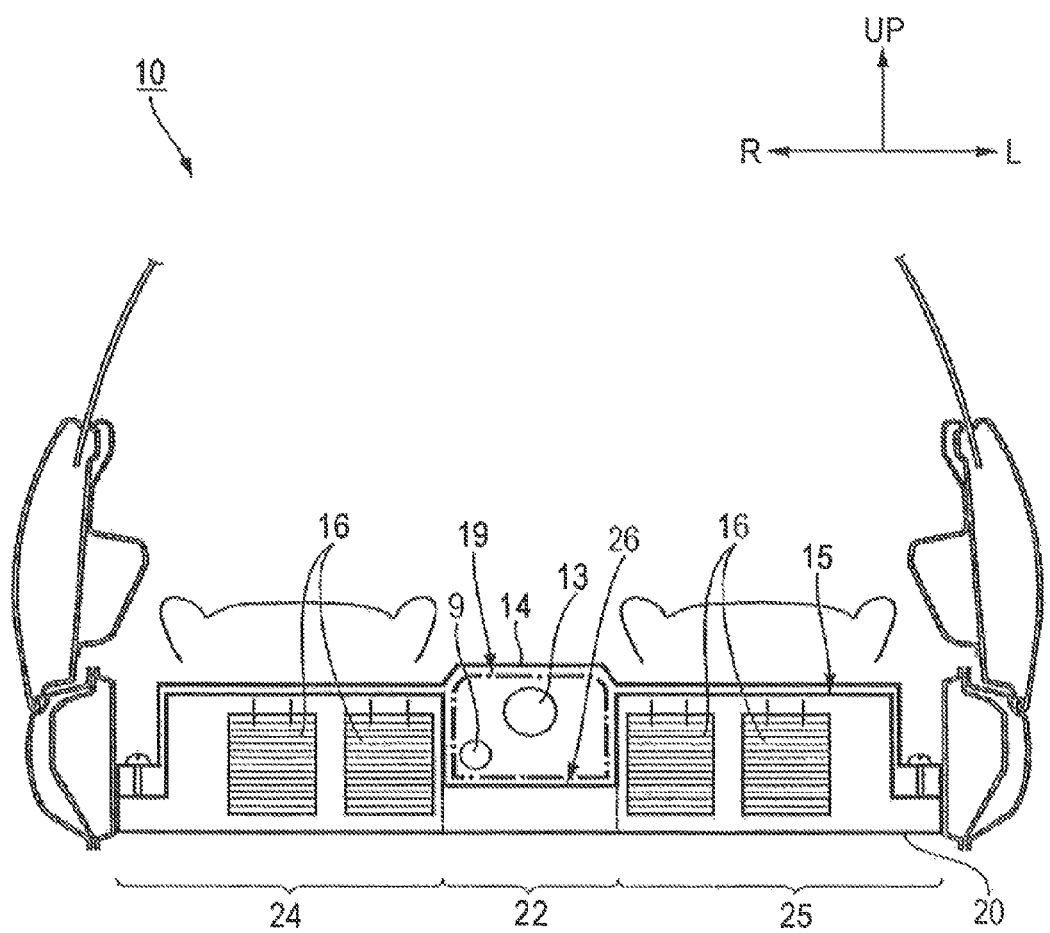
FIG. 3 is a cross-sectional of the structure view taken along a line III-III in FIG. 1.

FIG. 2 is a schematic side view of the structure of the hybrid vehicle 10 according to the embodiment of the present invention, and FIG. 3 is a cross-sectional view of the structure taken along a line III-III in FIG. 1.

As illustrated in FIGS. 1 to 3, the hybrid vehicle 10 in the present embodiment includes an engine (internal combustion engine) 11, which is located at forward side in the travelling direction of the hybrid vehicle 10. The front of the engine 11 is provided with a radiator 17 and a radiator fan 17a. Although the radiator fan 17a is for cooling the radiator 17, in the present embodiment, the radiator fan 17a is configured to rotate the radiator fan 17a irrespective of the temperature of the radiator 17 so as to also serve as a fan for cooling the engine 11 and sending the heat from the engine 11 backward. The engine 11 is connected to a clutch, which is not illustrated. The clutch is then connected to a transmission 12.

That is to say, in the hybrid vehicle 10, a driving force is transmitted from the engine 11 to the transmission 12 via the clutch. The transmission 12 is achieved by using a continuously variable transmission or the like. The transmission 12 is connected to a front differential gear, which is not illustrated. In the present embodiment, transmission is performed on what is illustrated in FIGS. 1 to 3, however, transmission may be performed on another device such as a motor.

The front differential gear is connected to front-wheel drive shafts on the left and right (not illustrated). That is to say, in the hybrid vehicle 10, the driving force of the engine 11 is transmitted to the front-wheel drive shafts on the left and right via the front differential gear.

The transmission 12 is connected to the propeller shaft 13. The transmission 12 includes a gear, which is not illustrated. Because the gear of the transmission 12 is engaged with the ring gear of the front differential gear, part of the driving force is transmitted to the propeller shaft 13.

The propeller shaft 13 is provided extending in the fore-and-aft direction of the vehicle below a floor panel 14 in the vertical direction of the vehicle. The rear end of the propeller shaft 13 in the fore-and-aft direction of the vehicle is connected to a rear differential gear, which is not illustrated. The rear differential gear is connected to rear-wheel drive shafts on the left and right (not illustrated). That is to say, part of the driving force is transmitted from the propeller shaft 13 to the rear-wheel drive shafts on the left and right via the rear differential gear.

The propeller shaft 13 and an exhaust pipe 9 for exhausting an exhaust gas emitted from the engine 11 are disposed below the floor panel 14 in the vertical direction of the vehicle. In this manner, at least the propeller shaft 13 and the exhaust pipe 9 are disposed below the floor panel 14 in the vertical direction of the vehicle as described above.

In the present embodiment, in addition to the propeller shaft 13 and the exhaust pipe 9, the hybrid vehicle 10 includes a battery pack 15 (battery unit) below the floor panel 14 in the vertical direction of the vehicle.

The battery pack 15 serves as an assembly for integrating battery modules 16, and a BCU (battery control unit), distribution cables, a junction box, and a service plug which are not illustrated.

That is to say, the battery pack 15 is integrally formed. Here, as described above, the hybrid vehicle 10 includes the propeller shaft 13 below the floor panel 14 in the fore-and-aft direction of the vehicle.

Therefore, in the case where the battery pack 15 is mounted below the floor panel 14 of a conventional FWD or 4WD vehicle, the battery pack 15 is divided into both sides of the propeller shaft 13 in the vehicle width direction.

On the other hand, in the hybrid vehicle 10 in the present embodiment, such as a FWD or 4WD vehicle which needs the propeller shaft 13, the integrated battery pack 15 is mounted in the vehicle as described above.

Specifically, the battery pack 15 includes a housing which is divided into the front, middle, and rear sections in the fore-and-aft direction of the vehicle, i.e., includes a front-side section 21, a middle part, and a rear-side section 23. The middle part of the battery pack 15 includes a middle section 22, and a right-side section 24 and a left-side section 25 on both sides of the middle section 22 in the width direction of the vehicle.

That is to say, the housing 20 of the battery pack 15 includes five divided sections, i.e., the front-side section 21, the middle section 22, the rear-side section 23, the right-side section 24 and the left-side section 25. In the battery pack 15, each of the battery modules 16, the BCU (Battery Control Unit), the distribution cables, the junction box, and the service plug is disposed in one of the front-side section 21, the middle section 22, the rear-side section 23, the right-side section 24 and the left-side section 25, and thus the battery pack 15 serves as an assembly as described above.

Here, the battery modules 16, the BCU (Battery Control Unit), the distribution cables, the junction box, and the service plug which constitute the battery pack 15 in the present embodiment are known technology, and thus detailed description is omitted and a simple description is given.

The battery modules 16 are respectively disposed in the right-side section 24 and the left-side section 25 of the battery pack 15. Each battery module 16 has a function of supplying electrical power to a drive motor as a driving source.

In the present embodiment, as described above, the battery pack 15 is formed such that two battery modules 16 are disposed in each of the left and right sides of the propeller shaft 13 in the width direction of the vehicle. However, for example, one large battery module 16 may be disposed in each of the left and right sides of the propeller shaft 13. Optionally, three small battery modules 16 may be disposed in each of the left and right sides of the propeller shaft 13.

The BCU is disposed in the middle section 22 of the battery pack 15. The BCU has a function of controlling the battery module 16. That is to say, the BCU measures the voltages, currents, temperatures, and the like of the battery modules 16 in order to recognize the state of each of the battery modules 16. In addition, the BCU monitors the input of electrical power to the drive motor from the battery modules 16.

Similarly to the BCU, the distribution cables are disposed in the middle section 22 of the battery pack 15. The distribution cables have a function of connecting the battery modules 16 to each other. The distribution cables are provided with the junction box. The junction box has functions of connecting, branching, and relaying the distribution cables.

The service plug is disposed in the front-side section 21 of the battery pack 15. The service plug has a function of breaking a high voltage which is generated from the battery modules 16. Thus, the service plug breaks a high voltage when the battery pack 15 is attached or detached, and thus provides safe working conditions.

In this manner, in the battery pack 15 in the present embodiment, each of the battery modules 16, the BCU (Battery Control Unit), the distribution cables, the junction box, and the service plug is disposed in one of the front-side section 21, the middle section 22, the rear-side section 23, the right-side section 24 and the left-side section 25, and thus the battery pack 15 is integrally formed.

The housing 20 of the integrated battery pack 15 is disposed on the lower side of the floor panel 14 so as to cover the propeller shaft 13. With the housing 20 attached to the vehicle body in this manner, a recess 26 is formed in the fore-and-aft direction of the vehicle. The recess 26 houses the propeller shaft 13 therein. Here, the battery pack 15 is disposed on the lower side of the floor panel 14 so as not to interfere with the propeller shaft 13 because of the recess 26.

Here, the battery pack 15 in the present embodiment is disposed at the lowest point in the vertical direction of the vehicle. That is to say, the battery pack 15 is not disposed at a section with projections and recesses, such as the back of the rear seats, and thus the lower surface of the battery pack 15 in the vertical direction of the vehicle can be formed in any shape. Thus, the battery pack 15 has a smoothly formed bottom surface.

For the recess 26 defined by the floor panel 14 and the battery pack 15, an air guide plate 18 for introducing air from the engine 11 and the radiator 17 is formed. An air guide duct 19 is defined in the recess 26 so as to contain the propeller shaft 13 and the exhaust pipe 9. The air guide duct 19 is composed of a heat insulating material. The air guide duct 19 is formed so as to introduce air to the rear of the vehicle. Thus, air with the heat from the engine 11 and the radiator 17 can be introduced to the rear of the vehicle by the air guide plate 18 and the air guide duct 19. Consequently, the battery modules 16 which tend to be influenced by heat can be protected from the heat from the engine 11 and the radiator 17.

Figure 4:
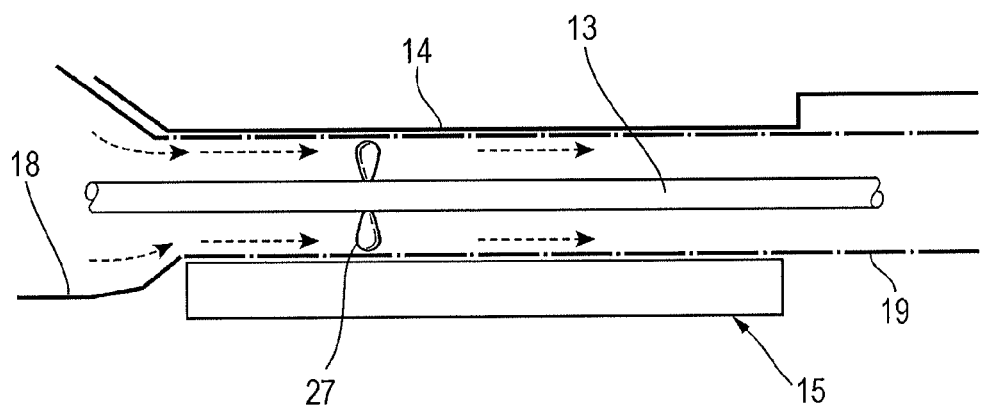
FIG. 4 is a side view of a portion including a propeller shaft and a battery pack according to the embodiment of the present invention.

As indicated in FIG. 4, it is also possible to mount an air guide fan 27 (a first fan) on the propeller shaft 13, and introduce air with the heat of the engine 11 by suction. In the above step, the mounting position is preferably adjusted as needed to a forward or backward position in the fore-and-aft direction of the vehicle so as to increase the effect. Alternatively, a plurality of air guide fans 27 may be mounted so as to further increase the effect.

Figure 5:
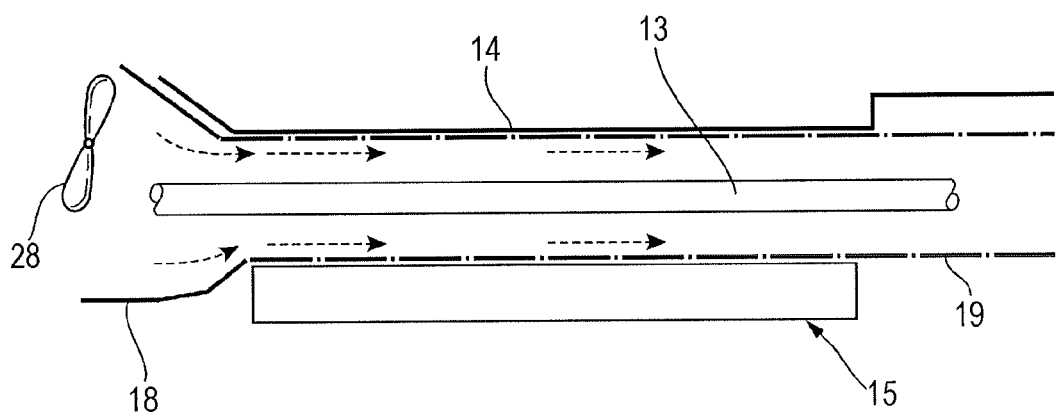
FIG. 5 is a side view of a portion including a propeller shaft and a battery pack according to another embodiment of the present invention.

As indicated in FIG. 5, it is also possible to mount an air guide fan 28 (a second fan) near the inlet of the air guide duct 19, and introduce air with the heat of the engine 11 by suction. It is also possible to mount the air guide fan 28 near the outlet of the air guide duct 19 so as to increase the effect. The air guide fan 28 may be attached both near the inlet and outlet, or either one of them as needed according to available space and a desired effect.

The surface of the recess 26 that faces the propeller shaft 13 may be composed of a heat insulating material. In addition, the floor panel 14 above the propeller shaft 13 may be covered with a heat insulating material. The above configuration allows the materials for producing the air guide duct 19 to be reduced, thereby providing advantages in weight and cost.

The mounting positions of the above-mentioned air guide fans 27, 28 and the number of mounting positions may be determined as needed so as to increase the effect. For example, mounting can be performed in combination such that an air guide fans 28 is mounted near the inlet of the air guide duct 19, and an air guide fans 27 is mounted on the propeller shaft 13 near the outlet of the air guide duct 19.

In this manner, the hybrid vehicle 10 in the present embodiment allows the integrated battery pack 15 to be disposed below the floor panel 14 of vehicles, so that the recess 26 defined by the floor panel 14 and the battery pack 15 serves as the air guide duct 19 for the air with the heat from the engine 11, and thus the air with the heat can be introduced to the rear of the vehicle and the battery modules 16 which tend to be influenced by heat can be protected from heat damage.

In the hybrid vehicle 10 in the present embodiment, the air guide plate 18 connects between the engine 11 or the radiator 17 and the air guide duct 19, and thus the air with the heat from the engine 11 or the radiator 17 can be exhausted to the rear of the vehicle. By mounting the air guide fan 27 to the propeller shaft 13 or mounting the air guide fan 28 to the inlet or outlet of the air guide duct 19, the air with the heat can be exhausted to the rear of the vehicle more efficiently without being in contact with the module 16.

In the present embodiment, in the hybrid vehicle 10, a cooling device 30 for supplying cooling air into the battery pack 15 is disposed in the rear-side section 23 of the battery pack 15.

The cooling device 30 includes a cooling fan 31 for sending cooling air, and a cooling duct 32 for sending the cooling air from the cooling fan 31 to the battery pack 15. The cooling fan 31 and the cooling duct 32 which constitute the cooling device 30 are known technology, and thus description is omitted.

Here, the battery pack 15 in the present embodiment is integrally formed as described above. That is to say, in the hybrid vehicle 10 in the present embodiment, the cooling air from the cooling fan 31 is sent into the battery pack 15 without branching, and thus the cooling air can be uniformly sent into the battery pack 15.

Thus, in the hybrid vehicle 10 in the present embodiment, a variation in the temperatures of the battery modules 16 in the battery pack 15 can be surpressed.

As described above, the hybrid vehicle according to the present embodiment is a hybrid vehicle which is driven using power of an internal combustion engine, and power of a drive motor which is driven by electric power supplied from a secondary battery, the vehicle including: a propeller shaft which is disposed below a floor panel in a vertical direction of the vehicle extending in a fore-and-aft direction of the vehicle, and is configured to transmit the power of the above-mentioned internal combustion engine and the power of the drive motor to a rear wheel; and a battery unit having the secondary battery, the battery unit being disposed below the floor panel so as to cover the propeller shaft. The battery unit has a recess formed in a fore-and-aft direction of the vehicle, and the propeller shaft is housed in an air guide duct defined by the floor panel and the recess of the battery unit. Thus, heat damage to the battery unit can be prevented. Therefore, heat damage to the battery pack can be prevented.

In the present embodiment, power of the engine 11 (internal combustion engine) disposed at the front of the vehicle is transmitted to the rear wheels via the propeller shaft 13, however, the drive motor 11' is driven by electric power supplied from the secondary battery may be disposed at the front of the vehicle so as to transmit the power of the drive motor via the propeller shaft 13.

What is claimed is:

1. A vehicle which is driven using power of a drive motor which is driven by electric power supplied from a secondary battery, the vehicle comprising:
a propeller shaft which is disposed below a floor panel in a vertical direction of the vehicle extending in a fore-and-aft direction of the vehicle, and is configured to transmit power of the drive motor to a rear wheel; and
a battery unit having the secondary battery, wherein
the battery unit includes a middle section, a right-side section and a left-side section in the width direction of the vehicle,
the battery unit is disposed below the floor panel so as to cover the propeller shaft, and
the battery unit has a recess that is open toward the floor panel formed in a fore-and-aft direction of the vehicle, and the propeller shaft is housed in an inner space enclosed by the floor panel and an upper surface of the recess which is configured as an air guide duct.

2. The vehicle according to claim 1, further comprising an air guide plate which extends from an internal combustion engine provided at a front of the vehicle to the air guide duct.

3. The vehicle according to claim 1, wherein the propeller shaft is provided with a first fan.

4. The vehicle according to claim 1, wherein the air guide duct is composed of a heat insulating material.

5. The vehicle according to claim 1, further comprising a fan provided at one or more of: an inlet of the air guide duct; an outlet of the air guide duct; and an intermediate position of the air guide duct between the inlet and the outlet.

6. The vehicle according to claim 3, wherein an inlet or outlet of the air guide duct is provided with a second fan.

* * * * *